United States Patent Office 3,340,241
Patented Sept. 5, 1967

3,340,241
PROCESS FOR PRODUCING ELASTOMERIC CO-
POLYMERS OF ETHYLENE WITH HIGHER
ALPHA-OLEFINS
Giulio Natta and Giorgio Mazzanti, Milan, Italy, assignors to Montecatini Edison S.p.A., Milan, Italy, a corporation of Italy
No Drawing. Filed Jan. 27, 1966, Ser. No. 523,258
Claims priority, application Italy, Oct. 24, 1960,
18,320/60; Nov. 25, 1960, 20,478/60
11 Claims. (Cl. 260—88.2)

This invention relates to an improved process for preparing elastomeric copolymerizates of ethylene with higher alpha-olefins, more particularly with propylene and butene-1, in contact with catalysts prepared from hydrocarbon-soluble vanadium compounds and alkyl aluminum compounds.

The selective production of higher alpha-olefin/ethylene copolymerizates consisting essentially of high molecular weight linear, amorphous copolymers of the higher alpha-olefin and ethylene, more particularly of propylene, or butene-1 and ethylene, by copolymerizing mixtures of the monomers in critical molar ratios and in contact with a catalyst prepared by mixing an alkyl aluminum compound with a hydrocarbon-soluble vanadium compound, has been disclosed by us.

The vanadium compounds useful for preparing the catalyst include hydrocarbon-soluble halogenated vanadium compounds such as vanadium tetrachloride and vanadium oxychloride, and hydrocarbon-soluble compounds of vanadium in which at least one of the valences of the metal is saturated by an organic group such as an alkoxy group or an acetylacetonic group.

We found that catalysts prepared from hydrocarbon-soluble halogenated vanadium compounds of the type of vanadium tetrachloride and vanadium oxytrichloride, and an alkyl aluminum compound have a very high activity which, though decreasing with time, remains satisfactory for relatively long times after the catalyst preparation. Therefore, by using those catalytic systems, it is possible to obtain very high yields, based on the amount of catalyst used, of high molecular weight linear amorphous copolymerizates of ethylene with the higher alpha-olefins.

More particularly, when the copolymerization is carried out in the absence of an inert organic solvent, it is possible, by using the catalysts prepared from $VCl_4$ or $VOCl_3$ to obtain, within a short copolymerization time, a yield of the order of 1000 parts by weight of copolymerizates per part by weight of catalyst used.

By carrying out the copolymerization with our catalysts prepared from e.g., a diethyl aluminum monohalide and a vanadium acetylacetonate or vanadyl alkyl orthovanadate, crude copolymerizates are obtained from which, by fractionation with boiling solvents using, successively, e.g., acetone, ethyl ether, n-hexane and n-heptane, fractions can be separated which are close to each other in composition. Also, the crude copolymerizates obtained with the last mentioned type of catalysts show a narrow distribution of the molecular weight. However, the copolymerization in contact with the catalytic systems prepared from vanadyl orthovanadates or the acetylacetonates on a commercial scale is not practical because the yield of copolymerizate obtainable per weight unit of catalyst is relatively low.

The catalysts prepared from vanadyl alkoxide or the acetylacetonates, when used at temperatures near room temperature or at higher temperatures, show a comparatively low initial activity and, moreover, their activity decreases with time more rapidly than in the case of the catalytic systems prepared by $VCl_4$ or $VOCl_3$.

The primary object of this present invention is to increase the yield of copolymerizate produced, per weight unit of the catalyst, when ethylene is copolymerized with aliphatic alpha-olefins in contact with catalysts prepared from an alkyl aluminum halide and a hydrocarbon-soluble vanadium compound in which at least one of the valences of the metal is satisfied by an organic group.

Another object is to obtain the increased yield of the copolymerizate when the copolymerization is carried out in contact with said catalysts at room temperature, or close to room temperature.

These and other objects as will appear hereinafter are accomplished by including, in the copolymerization system, a selected agent which, through dative bonds, forms a complex with the organometallic aluminum compound used as one catalyst-forming component.

According to this invention, the organometallic aluminum compound used as one catalyst-forming component corresponds to the formula $R_2AlX$ in which R is an alkyl group containing from 1 to 6 carbon atoms, and X is any halogen. Typical compounds of this type are the dimethyl-, diethyl-, di-isopropyl-, di-isobutyl-, di-n-hexyl-aluminum-monochlorides, -bromides, -iodides and -fluorides.

The hydrocarbon-soluble vanadium compound used as second catalyst-forming component is a vanadium acetylacetonate, a vanadyl acetylacetonate, a vanadyl trialkoxide $VO(OR)_3$, or a vanadyl halogen-alkoxide corresponding to one of the formulae $VO(OR)_2X$ or $VOORX_2$, in which formulae R is an alkyl radical containing from 1 to 8 carbon atoms, and X is F, Cl, Br, or I. Specific vanadium compounds are: vanadyl diacetylacetonate, vanadium triacetylacetonate, trimethyl-, triethyl-, tripropyl-, tributyl-, tri-tert-butyl-, tri-(2-ethyl)-hexyl orthovanadate and the corresponding dialkyl-monochloro- and monoalkyl-dichloro-orthovanadates.

We have established that only specific selected compounds capable of forming a complex with the dialkyl aluminum monohalide, through dative bonds, can be used successfully for accomplishing our purposes of prolonging the active life of the catalysts of the type aforesaid without decreasing the yield of copolymerizate obtained.

The complexing agents which can be used are compounds of the formula RYR' in which Y is oxygen or sulfur and R and R' each represent a linear or branched alkyl group containing from 1 to 14 carbon atoms or an aromatic nucleus containing from 6 to 14 carbon atoms, at least one of R and R' being either a branched alkyl group or an aromatic nucleus; a tertiary amine of the formula

in which R to R" each represent an alkyl group containing from 1 to 14 carbon atoms or an aromatic nucleus, containing from 6 to 14 carbon atoms, at least one of R to R" being an aromatic nucleus; or a tertiary phosphine

in which R to R" each represent an alkyl radical containing from 1 to 14 carbon atoms or an aromatic nucleus containing from 6 to 14 carbon atoms, at least one of R to R" being an aromatic nucleus.

The following specific ethers and thioethers have been found to be particularly effective as complexing agents:
diisopropyl ether
di-isoamyl ether
anisole diphenyl ether
dibenzyl ether
diphenyl sulfide
diisopropyl sulfide Specific tertiary amines and phosphines which it has been found particularly advantageous to use as the complexing substance are the following:

diphenylmethylamine
triphenylamine
tribenzylamine
methylphenylbenzylamine
triphenylphosphine
ethyl-diphenylphosphine The addition of the specific complex-forming compound has the effect of increasing the activity of the catalysts. A particular advantage of adding the complex-forming compound is that it inhibits the marked decrease in activity with time which normally occurs in the case of the catalysts prepared from vanadium compounds of the specified type. The inhibiting effect is such that the decrease in activity occurs much less rapidly, with the important practical result that the yield of copolymerizate on the amount of catalyst used is considerably increased, rendering feasible the use of those catalysts in large-scale commercial operations.

Table I below shows the amounts of ethylene-propylene copolymerizate obtained after a copolymerization time of 18 minutes with the same amounts of differently aged catalysts prepared from diethyl aluminum monochloride and vanadium triacetylacetonate, in the presence of a complex-forming agent consisting of diisopropyl ether or anisole, compared to the amounts of copolymerizate obtained in absence of the complex-forming agent.

As shown in the table, the amounts of copolymerizate obtainable with a non-aged catalyst containing the specific and selected complex-forming agent are slightly higher than those obtainable with the same catalyst not containing the complex-forming agent. It is evident that the catalysts prepared in the absence of the specific and selected complex-forming agent lose their activity with time much more rapidly.

When both catalysts are aged, and the ageing time is the same for both catalysts, the amounts of copolymerizate obtained in a given copolymerization time are more than double when catalysts according to this invention and containing the complex-forming agents are employed.

The activity of the catalyst used in the present process varies with the molar ratio between the dialkylaluminum monohalide and vanadium compound used in preparing the catalyst. The molar ratio between the $R_2AlX$ and the vanadium compound is between 2 and 10, preferably between 3 and 5.

TABLE I (Comparison between the amount of ethylene-propylene copolymer obtained with catalysts prepared from $Al(C_2H_5)_2Cl$ and $VAc_3$ (vanadium triacetylacetonate) with and without addition of complex-forming agents.)

Polymerization:
    Mols $C_3H_6$/mols $C_2H_4$ in the
        gaseous mixture feed _____ 4.
    Temperature _____ 25° C.
    Pressure _____ 1 ab. atm.
    Mols $Al(C_2H_5)_2Cl$ _____ 0.007.
    $Al(C_2H_5)_2Cl/VAc_3$ molar ratio_____ 5.
    Polymerization solvent _____ 350 ml. of n-heptane.
    $C_2H_4$ mols in the copolymer _____ 53±2%.

| Time elapsing between the preparation of the catalyst and its use, minutes | G. copolymer obtained within 18 minutes, g. $VAc_3$ | | |
|---|---|---|---|
| | Catalyst prepared from $Al(C_2H_5)_2Cl + VAc_3$ | Catalyst prepared from $Al(C_2H_5)_2Cl + VAc_3$+isopropyl ether | Catalyst prepared from $Al(C_2H_5)_2Cl + VAc_3$+anisole |
| 0 | 22 | 24 | 23 |
| 5 | 4.4 | 9.5 | 8.2 |
| 15 | 2.0 | 4.8 | 4.8 |
| 30 | 1.0 | 3.2 | 3.0 |

The favorable effect of the presence of complex-forming compounds is remarkable and is noticeable even when very small amounts of the complex-forming agent are used.

A considerable increase in the amount of copolymerizate produced is observed by addition of complex-forming agents, such as diisopropyl ether, in an amount of from 0.01 mol to 0.1 mol per mole of dialkyl aluminum monohalide.

However, the amount of complex-forming agent can vary within rather wide limits, e.g., between 0.1 and 2 mols per mole of dialkyl aluminum monohalide.

The best results are obtained with amounts of complex-forming agent comprised between 0.05 and 1.0 mol per mole of $AlR_2X$.

The copolymerization can be carried out in various ways, e.g., by mixing the complex-forming compound with the alkyl aluminum halide in a solvent, then adding the mixture to a solution of the vanadium compound, and finally contacting the whole with the monomers. In a presently preferred embodiment, the complex-forming substance is mixed with the alkyl aluminum halide and that mixture is then added to a mixture of the vanadium compound and the monomers to be copolymerized.

Said preferred procedure is particularly useful for the production of copolymerizates having a narrow distribution of molecular weights.

The copolymerization can be carried out continuously by supplying periodically or continuously additional catalytic agent to the system and maintaining a constant ratio between the concentrations of the monomers in the liquid phase in which the copolymerization takes place. This result can be obtained by feeding a mixture of the monomers having a constant composition continuously to the system.

When operating in the absence of an inert solvent, it is also possible to feed ethylene in an excess of, e.g., propylene, to the system while maintaining the pressure and temperature constant.

The fact that a considerable increase in the amount of copolymerizate produced could be obtained by including the specific and selected ethers, thioethers, tertiary amines or tri-substituted phosphines as disclosed herein, in the copolymerization system during the copolymerization of ethylene with higher alpha-olefins in contact with catalysts prepared from dialkyl aluminum monohalides and vanadium-or vanadyl acetylacetonates, vanadyl trialkoxides or vanadyl halogen-alkoxides was unknown prior to the present invention and could not be foreseen on the basis of available knowledge.

The unpredictability of the present results is demonstrated by the fact that the addition of other organic bases according to Lewis, such as, e.g., pyridine (which activate catalytic systems on the basis of transition metal halides and metal alkyls) to the catalysts with which the present invention is concerned, instead of increasing their activity, causes a decrease in the yield of copolymerizate obtained and can even inhibit the copolymerization completely.

This is demonstrated by the following results according to which:

By repeating Example I, run 1 of Table II below, using the catalyst prepared from vanadium triacetylacetonate and diethyl aluminum monochloride and, as the complexing agent, triethylamine and pyridine, respectively, we obtained 0.9 to 0 gram, respectively, of the copolymerizate as compared to the 12 grams obtained using diisopropyl ether as reported in the table, and the 11 grams obtained (run 1 of Table III below) when no complexing agent was employed with, however, the rapid decrease in the absence of any complexing agent;

By repeating Example I, run 2 of Table II below, using the catalyst prepared from vanadium triacetylacetonate and diethyl aluminum chloride and, as complexing agent, diethyl ether, tetrahydrofuran, triethylamine and pyridine, respectively, instead of diisopropyl ether, we obtained, respectively, yields of 1.2; 0; 0.2; and 0 gram of the copolymerizate, in contrast to the yield of 4.8 grams of the copolymerizate obtained using diisopropyl ether as the complexing agent reported in the table, and the yield of 2.2 grams of the copolymerizate obtained in the absence of any complexing agent reported in run 2 of Table III below; and By repeating Example 3, run 13 of Table V below, using catalyst prepared from vanadium triacetylacetonate and diethyl aluminum chloride and, as complexing agent, di-n-butyl ether, dioxane, and isopropyl alcohol, respectively, the yield of copolymerizate obtained was 0.2; 0; and 0 gram, respectively, in contrast to the 4.6 grams of copolymerizate obtained using diisopropyl ether as the complexing agent reported in the table, and the 2.2 grams reported for run 2, Table III, carried out in the absence of any complexing agent.

The copolymerization can be carried out in the presence of inert solvents, consisting of aliphatic hydrocarbons, such as, e.g., n-heptane, iso-octane, or aromatic hydrocarbons, such as, e.g., benzene, toluene.

The copolymerization can be carried out also in the absence of an inert solvent, the monomers being used in the liquid state. Thus, a solution of ethylene in the higher alpha-olefin to be copolymerized, kept in the liquid state, can be used.

The process is conveniently carried out at a temperature close to room temperature, i.e., at a temperature between 15° and 30° C. It is also possible to obtain essentially the same results by operating within rather wide temperature limits, e.g., between 0° and 125° C., preferably between 20° and 80° C.

Completely amorphous copolymerizates of ethylene with higher alpha-olefins, more particularly with propylene or butene, are in general obtained with an ethylene content, in the crude copolymerizate, not higher than 70% by weight.

In order to obtain the amorphous copolymerizates, it is necessary to maintain given minimum ratios of the comonomers in the monomer mixture during the copolymerization. To produce high molecular weight linear amorphous ethylene-propylene copolymers, the propylene/ethylene molar ratio in the reacting liquid phase during the copolymerization must be equal to or higher than 4. This corresponds to maintaining a propylene/ethylene molar ratio in the gaseous phase present in the reactor equal to or higher than 1, when the copolymerization is carried out in an inert hydrocarbon solvent under the equilibrium conditions in the aforesaid preferred temperature range.

To produce high molecular weight, linear amorphous copolymers of ethylene and butene-1, the butene/ethylene molar ratio in the reacting liquid phase during the copolymerization must be equal to or higher than 25. This corresponds to a butene/ethylene molar ratio in the gaseous phase present in the reactor equal to or higher than 1.8, when the copolymerization is carried out in an inert hydrocarbon solvent, under equilibrium conditions in the preferred temperature range.

By operating under the conditions generically indicated herein and as shown in detail in the following examples, it is possible to obtain amorphous copolymers of ethylene with higher alpha-olefins, more particularly with propylene and butene-1, which copolymerizates, when fractionated by successive extractions with boiling liquids having increasing dissolving capacity, yield fractions having essentially the same composition.

Thus, for instance, by copolymerizing ethylene and propylene in contact with a catalyst prepared from vanadium triacetylacetonate, diethyl aluminum monochloride and diisopropyl ether, at the temperature of 25° C., in benzene as the inert solvent, and maintaining in the gaseous phase a propylene/ethylene molar ratio of 3, a high molecular weight linear copolymerizate, which is amorphous on X-ray examination and contains 51% ethylene by mols, is obtained.

The crude copolymerizate is completely extractable with boiling n-hexane. When it is fractionated by extraction with boiling solvents using, successively, acetone, ether and n-pentene, it is found that the prevailing fractions are those extractable with ethyl ether and n-pentene, i.e., solvents boiling at about the same temperature.

The composition of the various fractions, determined by radio-chemical methods, differs by only a few units percent from that of the crude copolymerizate.

More specifically, the ether extract contains 46% by mols of ethylene, the pentane extract 50% and the residue, soluble in hexane, contains 57% of ethylene by mols.

By carrying out the ethylene-propylene copolymerization with the same catalyst and under the aforementioned conditions but feeding into the reactor a gaseous mixture of propylene and ethylene having a propylene/ethylene molar ratio of 4, a copolymerizate completely extractable with boiling n-hexane and containing 47% of ethylene by mols is obtained.

More specifically, the ether extract contains 42% of ethylene by mols, the pentane extract contains 46%, and the residue which is soluble in n-hexane contains 49% of ethylene by mols.

Operating with a catalyst prepared from vanadium triacetylacetonate, diethyl aluminum monochloride and anisole and feeding in a gaseous mixture having a propylene/ethylene molar ratio of 4, under the aforementioned conditions, an ethylene-propylene copolymerizate containing 46.2% of ethylene by mols is obtained. This copolymerizate, when extracted with the boiling solvents, yields an ether extract containing 42% of ethylene by mols and a hexane extract containing 50% of ethylene by mols.

The X-ray spectra and infrared absorption spectra of the linear amorphous copolymers obtained according to the process of the present invention are the same as those of the high molecular weight, linear, amorphous, elastomeric copolymers previously disclosed by Natta et al. They can also show a restricted distribution of molecular weights, especially when the catalyst is prepared in the presence of the monomers.

For instance, an ethylene-propylene copolymerizate produced at a temperature of 25° C. with a catalyst prepared, in the presence of the mixture of monomers to be copolymerized, from vanadium triacetylacetonate, aluminum diethyl monochloride and diisopropyl ether (Al/ether/V molar ratio=1:1:0.2) and feeding in a gaseous mixture having a $C_3H_6/C_2H_4$ molar ratio of 4, has an intrinsic viscosity (determined in tetrahydronaphthalene at 135° C.) of $2.0 \times 100$ cc./g.

The copolymer fraction obtained by extracting said copolymerizate with boiling ether corresponds to 72% of the crude and has an intrinsic viscosity (determined at 135° C. in tetrahydronaphthalene) of $1.88 \times 100$ cc./g. The residual fraction, completely soluble in boiling n-hexane, has an intrinsic viscosity of $2.4 \times 100$ cc./g. determined in the same way.

The molecular weight of the copolymers produced according to the process of the present invention can be regulated by the methods which have been disclosed for regulating the molecular weight of polymers produced by coordinated anionic polymerization processes.

For instance, the copolymerization can be carried out in the presence of certain organometallic compounds, such as, e.g., zinc dialkyls, or small amounts of gaseous hydrogen can be added to the copolymerizing system.

The copolymerizates of ethylene with the higher alpha-olefins obtained by the present process are saturated.

By operating with the catalysts and the modalities described above, it is possible to obtain, also, high molecular weight, linear amorphous copolymerizates containing double bonds, and which are vulcanizable by processes used for vulcanizing unsaturated rubbers. This can be achieved by including small amounts of conjugated dienes having terminal unsaturation, or of acetylenic hydrocarbons, with the ethylene and higher alpha-olefin.

The amorphous copolymers obtained according to the process of the present invention are non-film-forming and are suitable for various uses in the field of synthetic rubber; particular advantages from the standpoint of workability and mechanical properties of the vulcanized products are found in the copolymers having a restricted distribution of the molecular weight.

By using other ratios of the comonomers, different from the ratios indicated above, it is possible to obtain, using the present modified catalysts, copolymerizates of ethylene with higher alpha-olefins which show, on X-ray examination, a crystallinity that increases with increasing ethylene content in the copolymer molecule. The copolymers which exhibit crystallinity are very different from the linear amorphous copolymers, are film-forming and can be used as plastics.

The following examples are given to illustrate the invention and are not intended to be limiting.

*Example 1*

The reaction apparatus consists of a large test tube having a capacity of 750 ml. and a diameter of 5.5 cm., provided with a tube for feeding and discharging the gases, a mechanical agitator and a thermometer sheath. The tube for introducing the gases reaches the bottom and ends with a porous diaphragm (diameter 3.5 cm.). The reactor is immersed in a bath kept at the constant temperature of 25° C.

350 ml. of anhydrous heptane are introduced into the previously de-aerated apparatus, under nitrogen, and the solvent is then saturated by passing through it a mixture containing propylene and radioactive ethylene in a molar ratio of 4:1, with a flow-rate of 200 N L./h.

A solution of 7 millimols of diethyl aluminum monochloride and 1.4 millimols of diisopropyl ether in 25 ml. of anhydrous benzene is then introduced. After about 1 minute, a solution of 1.4 millimols of vanadium triacetylacetonate in 25 ml. of benzene is added.

The feeding of mixture of the two monomers is continued with a flow-rate of 200 N l./h. for 18 minutes, while agitating the mass. During this time, it is noted that the reacting phase becomes more and more viscous.

The run is then stopped by introducing 50 ml. of methanol and the copolymerizate obtained is dissolved in n-heptane and purified by successive treatments with aqueous hydrocloric acid. The heptane phase is then shaken vigorously with water and finally coagulated completely with acetone and methanol.

12 g. of ethylene-propylene copolymer, containing 53.5% by mols of ethylene, as determined by radiochemical analysis are thus obtained.

The results of this run are reported in Table II, run 1.

By operating in a very similar manner but preparing the catalyst in the absence of the monomers (by mixing a solution of 7 millimols of diethyl aluminum monochloride and 1.4 millimols of diisopropyl ether in 25 cc. of anhydrous benzene with a solution of 1.4 millimols of vanadium triacetylacetonate in 25 cc. of benzene) and introducing the catalyst thus preformed and kept at 25° C. into the reaction apparatus after various times from its preparation, the results reported in Table II, runs 2 to 4, are obtained.

TABLE II

| Run | Time elapsing between the catalyst preparation and use, minutes | Copolymer obtained, g. | $C_2H_4$ mols, percent |
|---|---|---|---|
| 1 | 0 | 12 | 53.5 |
| 2 | 5 | 4.8 | 55.5 |
| 3 | 15 | 2.4 | 55.0 |
| 4 | 30 | 1.6 | 51.0 |

By operating under the conditions reported in Table II, but without addition of diisopropyl ether in the preparation of the catalyst, the results reported in Table III are obtained.

TABLE III

| Time elapsing between the catalyst preparation and use, minutes | Copolymer obtained, g. | $C_2H_4$ mols, percent |
|---|---|---|
| 0 | 11 | 54.5 |
| 5 | 2.2 | 53.5 |
| 15 | 1.0 | 53.0 |
| 30 | 0.6 | 51.2 |

The products obtained in runs 1–4 are found to be amorphous upon X-ray examination and leave no residue when extracted with boiling n-hexane.

The copolymer produced in run 2 was fractionated by extraction with boiling solvents, using, successively, acetone, ether and n-hexane. The acetone extract amounts to 1% of the total product.

The ether extract, corresponding to 30% of the crude, consists of a solid elastic product containing 52.1% by mols of ethylene as determined radiochemically. The hexane extract corresponding to 69% consists of a solid copolymer, amorphous on X-ray examination and containing 58% by mols of ethylene. The copolymerizate produced in run 3 was fractionated in similar manner. The acetone extract amounts to 1% of the total product. The ether extract, corresponding to 64.30% consists of a solid elastic copolymer containing 48.5% by mols of ethylene, as determined radiochemically. The hexane extract, corresponding to 34.7% consists of a solid copolymer, amorphous at the X-rays, and containing 62% by mols of ethylene.

No residue remains after the hexane extraction.

*Example 2*

By operating as described in runs 2 to 4 of Example 1 but using anisole instead of diisopropyl ether in the preparation of the catalyst, the results reported in Table IV are obtained.

TABLE IV

| Run | Time elapsing between the catalyst preparation and use, minutes | Copolymer obtained, g. | $C_2H_4$ mols, percent |
|---|---|---|---|
| 5 | 5 | 4.1 | 50 |
| 6 | 15 | 2.4 | 49 |
| 7 | 30 | 1.5 | 52 |

The increase in the activity of the catalytic system due to the addition of anisole is evident on comparing these results with those reported in Table III.

The copolymers obtained according to runs 5–7 are found to be amorphous on X-ray examination and do not leave any residue after extraction with n-hexane.

The copolymer produced operating according to run 5 was fractionated by extraction with boiling solvents. The acetone extract amounts to 0.5%.

The ether extract, corresponding to 30.5%, contains

43% by mols of ethylene. The hexane extract, corresponding to 69%, contains 52% by mols of ethylene.

Example 3

The procedure is similar to that described in Example 1, run 2, but different diisopropyl ether/diethyl aluminum monochloride molar ratios are used in the preparation of the catalyst.

The catalyst is prepared using 1.4 millimole of vanadium triacetylacetoante and an $Al(C_2H_5)_2Cl/VAc_3$ molar ratio of 5.

The results of these runs are reported in Table V.

TABLE V

| Run | (i-$C_3H_7$)$_2$C mols/ Al($C_2H_5$)$_3$Cl mols | Copolymer obtained, g. | $C_2H_4$ mols, percent |
|---|---|---|---|
| 9 | 0.025 | 2.55 | 46.5 |
| 10 | 0.05 | 5 | 47.0 |
| 11 | 0.1 | 4.7 | 46.2 |
| 12 | 0.2 | 4.5 | 49.5 |
| 13 | 1 | 4.6 | 50.0 |
| 14 | 7 | 0.2 | |

The copolymers produced by operating according to runs 12, 13 and 14 were fractionated by extraction with boiling solvents, using, successively, acetone, ether and n-hexane. None of the copolymers leaves a residue non-extractable with n-hexane. The copolymer produced according to run 12 gives an acetone extract corresponding to 1% of the total product, an ether extract corresponding to 29.7% and containing 40% by mols of ethylene, and a hexane extract corresponding to 76.3% and containing 48.5% by mols of ethylene.

The copolymer produced according to run 13 gives an acetone extract corresponding to 0.8% of the total product, an ether extract corresponding to 32.3% and containing 41% by mols of ethylene and a hexane extract corresponding to 66.9% and containing 51% by mols of ethylene.

The copolymer produced according to run 14 gives an acetone extract corresponding to 1% of the total product, an ether extract corresponding to 30% and containing 45% by mols of ethylene, and a hexane extract corresponding to 69% and containing 51% by mols of ethylene.

Example 4

By operating as described in Example 1, run 2, but using diphenyl ether instead of diisopropyl ether in the preparation of the catalyst, 3.6 g. of ethylene-propylene copolymer containing 45% by mols of ethylene are obtained in 18 minutes.

Example 5

By operating as described in Example 1, run 2, but using diethyl aluminium monoiodide instead of diethyl aluminum monochloride in the preparation of the catalyst, 4 g. of ethylene-propylene copolymer containing 48% by mols of ethylene are obtained in 18 minutes.

Under the same conditions, but without adding diisopropyl ether, only 1.1 g. of copolymer are obtained in 18 minutes.

Example 6

The procedure is the same as described in Example 1. The catalyst is prepared in the absence of the monomers by mixing a solution of 7 millimols of diethyl aluminum monochloride and 1.4 millimols of diphenyl ether in 25 cc. of anhydrous benzene with a solution of 1.4 millimols of ethyl orthovanadate (vanadyl triethylate) in 25 cc. of benzene.

Fifteen minutes after the preparation, the catalyst is introduced into the reaction apparatus. 4.7 g. of ethylene-propylene copolymer containing 49.5% by mols of ethylene, are obtained in 10 minutes.

By operating under the same conditions, but without the addition of diphenyl ether in the preparation of the catalyst, 3 g. of ethylene-propylene copolymer are obtained in 10 minutes.

Example 7

The apparatus described in Example 1 is used. 350 cc. of anhydrous n-heptane are introduced and then saturated at 25° C. by passing through the solvent a mixture containing propylene and ethylene in the molar ratio of 4:1, with a flow-rate of 200 N l./h.

The catalyst is prepared separately by adding, under nitrogen, while agitating, a solution containing 21 millimols of diethyl-aluminum monofluoride and 2.1 millimols of diisopropyl ether in 25 cc. of benzene to a solution of 1.4 millimols of vanadium triacetylacetonate in 25 cc. of benzene.

The catalytic mixture thus prepared is kept at 25° C. under nitrogen for 5 minutes and then introduced into the reactor.

After introduction of the catalyst, the ethylene-propylene mixture is continuously fed into, and discharged from the reactor for 18 minutes. After this time, the copolymerization is stopped and, proceeding as described above, 5.8 g. of a copolymer which is amorphous by X-ray examination and contains 45% by mols of ethylene are obtained.

By operating in a similar way, but in the absence of diisopropyl ether, 1.2 g. of copolymer are obtained.

These results show definitely that by operating in the presence of the complex-forming agent, the amount of copolymerizate produced is 4.8 times higher than the amount produced in the absence of complex-forming agent.

Example 8

Using apparatus as described in Example 1, 350 ml. of anhydrous heptane are introduced into the previously deaerated apparatus, under a nitrogen atmosphere, and the solvent is then saturated by passing through it a mixture containing propylene and radioactive ethylene in the molar ratio of 4:1, with a flow-rate of 200 N l./h.

The catalyst is preformed at 25° C. by mixing a solution of 7 millimols diethyl aluminum monochloride and 1.4 millimols diphenylmethylamine in 25 ml. anhydrous benzene with a solution of 1.4 millimole vanadium triacetylacetonate in 20 ml. benzene.

The catalyst is introduced into the reaction apparatus 5 minutes after its preparation. The feeding of the mixture of the two monomers is continued with a flow-rate of 250 N l./h. for 18 minutes while agitating the mass.

The run is then stopped by introducing 50 ml. methanol and the copolymer obtained is dissolved in n-heptane and purified by treatment with aqueous hydrochloric acid. The heptane phase is then shaken repeatedly with water and finally coagulated completely with acetone and methanol.

4.9 g. of ethylene-propylene copolymerizate, containing 47% by mols of ethylene, determined radiochemically, are thus obtained.

The product is found to be amorphous upon X-ray examination and leaves no residue after extraction with boiling n-heptane.

It was fractionated by extraction with boiling solvents, using, successively, acetone, ether and n-heptane. The acetone extract amounts to 1% of the total product.

The ether extract, corresponding to 35%, consists of a solid elastic linear copolymer containing 43.5% by mols of ethylene as determined radiochemically. The hexane extract, corresponding to 64%, consists of a solid, linear copolymer which is amorphous on X-ray examination and contains 51% by mols of ethylene.

By operating in a very similar manner, but preparing the catalyst without addition of diphenylmethylamine, 2.2 g. of ethylene-propylene copolymer are obtained in 18 minutes.

Example 9

The apparatus described in Example 8 is employed. 350 cc. of anhydrous n-heptane are introduced and then saturated at 25° C. by passing through it a mixture containing propylene and ethylene in the molar ratio of 4:1 with a flow-rate of 200 N l./h.

The catalyst is prepared separately by adding (under nitrogen, while agitating) a solution containing 7 millimols diethylaluminum monochloride and 1.4 millimols triphenyl amine in 25 cc. benzene to a solution of 1.4 millimols vanadyl diacetylacetonate in 25 cc. benzene.

The catalyst thus prepared is kept at 25° C. under nitrogen for 5 minutes and then introduced into the reaction apparatus. The ethylene-propylene mixture is charged and discharged with a flow-rate of 250 N l./h.

After 18 minutes, the reaction is stopped by addition of 50 cc. methanol. By proceeding as described in Example 1, 6.1 g. of an ethylene-propylene copolymerizate which is amorphous by X-ray examination, contains 45% by mols of ethylene and is completely extractable with boiling n-heptane are obtained. By operating analogously, but in the absence of triphenylamine, only 3.1 g. of copolymerizate are obtained.

Example 10

The procedure is the same as that described in Example 8, but triphenylamine is used instead of diphenylmethylamine in the preparation of the catalyst.

The catalyst is prepared in the absence of the monomers by mixing a solution of 7 millimols diethylaluminum monochloride and 1.4 millimols triphenylamine in 23 cc. anhydrous benzene with a solution of 1.4 millimols vanadium triacetylacetonate in 25 cc. benzene.

Five minutes after its preparation, the catalyst is introduced into the reaction apparatus. Within 18 minutes there are obtained 4.5 g. of an ethylene-propylene copolymerizate which contains 49% by mols of ethylene, is amorphous upon X-ray examination, and is completely extractable with boiling n-hexane.

By operating under the same conditions, but without the addition of triphenylamine in the preparation of the catalyst, 2.2 g. of ethylene-propylene copolymerizate are obtained.

Example 11

The procedure is similar to that described in Example 8, but triphenylphosphine is used instead of diphenylmethylamine in preparing the catalyst.

The catalyst is prepared in the absence of the monomers, by adding, under nitrogen while agitating, a solution containing 7 millimols diethyl aluminum monochloride and 1.4 millimols triphenylphosphine in 25 cc. benzene to a solution of 1.4 millimols vanadium triacetylacetonate in 23 cc. of benzene.

The catalyst thus prepared is kept at 25° C. under nitrogen for 5 minutes, and is then introduced into the reaction apparatus.

After 18 minutes, there are obtained 4.2 g. of an ethylene-propylene copolymerizate which contains 50.5% by mols of ethylene, is amorphous upon X-ray examination, and completely extractable with boiling n-heptane.

By operating under the same conditions but without the addition of triphenylphosphine in the preparation of the catalyst, 2.2 g. of ethylene-propylene copolymer are obtained in 18 minutes.

As can be seen from the examples, the copolymerizates obtained by the present process comprise only small amounts of acetone-soluble oily copolymers.

The process of the invention is particularly useful in the production of copolymerizates consisting essentially of linear copolymers free of homopolymers, and which are non-film-forming, amorphous at the X-rays, contain from 5% to 70% by weight of ethylene in the copolymer molecule, and have a molecular weight above 20,000. The ethylene-propylene copolymers show, in the infrared spectrum therefor, bands between 13.4 microns and 13.8 microns.

However, catalysts modified by the inclusion of the complex-forming agents as disclosed herein can also be used to produce film-forming, plastic, linear copolymers of ethylene with higher alpha-olefins which exhibit crystallinity at the X-rays.

This application is a continuation-in-part of our application Ser. No. 147,201 filed Oct. 24, 1961.

Various changes and modifications can be made in practicing the invention without departing from the spirit thereof, and therefore it is intended to include in the scope of the appended claims all such variations as may be apparent to those skilled in the art from the description and working examples given herein.

We claim:

1. In the production of copolymerizates of ethylene with a higher alpha-olefin selected from the group consisting of propylene and butene-1, which copolymerizates consist essentially of high molecular weight, linear copolymers of ethylene and the higher alpha-olefin that are free homopolymers and amorphous on X-rays examination, by copolymerizing a mixture of ethylene and the higher alpha-olefin at a temperature of from 0° C. to 125° C., in contact with a catalyst prepared from (1) a dialkyl aluminum halide in which the alkyl groups contain from 1 to 6 carbon atoms and (2) a vanadium compound selected from the group consisting of vanadium acetylacetonates, vanadyl acetylacetonates and vanadyl trialkoxides having the formula VO(OR)$_3$, in which R is an alkyl radical containing from 1 to 8 carbon atoms, in a molar ratio of (1) to (2) between 2 and 10, the improvement which consists in retarding decrease in the activity of said catalyst and increasing the yield of copolymerizate based on the amount of catalyst used, by effecting the copolymerization in the presence of from 0.01 mol to 2.0 mol per mol of the dialkyl aluminum halide of a substance capable of forming, through dative bonds, a complex with the dialkyl aluminum halide and selected from the group consisting of ethers having the formula RYR' in which Y is selected from the group consisting of oxygen and sulfur and R and R' are selected from the group consisting of linear and branched alkyl radicals containing from 1 to 14 carbon atoms and aromatic radicals containing from 6 to 14 carbon atoms at least one of R and R' being a branched alkyl group, ethers and thioethers of said formula in which at least one of R and R' is an aromatic nucleus, tertiary amines of the formula

in which R, R' and R'' are selected from the group consisting of alkyl radicals containing from 1 to 14 carbon atoms and aromatic radicals containing from 6 to 14 carbon atoms, at least one of R, R' and R'' being an aromatic nucleus, and tertiary phosphines of the formula

in which R, R' and R'' are selected from the group consisting of alkyl radicals containing from 1 to 14 carbon atoms and aromatic radicals containing from 6 to 14 carbon atoms, at least one of R, R' and R'' being an aromatic nucleus, while maintaining a molar ratio of the higher alpha-olefin to ethylene in the reacting liquid phase of at least 4 when the higher olefin is propylene and of at least 25 when the higher olefin is butene-1.

2. The process according to claim 1, characterized in that the catalyst is prepared in the presence of the mixed monomers to be copolymerized.

3. The process according to claim 1, characterized in that the catalyst is preformed.

4. The process according to claim 1, characterized in that the copolymerization is carried out in the absence of a solvent for the monomers, using the monomers in the liquid phase.

5. The process according to claim 1, characterized in that the catalyst is prepared from diethyl aluminum chloride and vanadium triacetylacetonate, and the complex-forming substance is diisopropyl ether.

6. The process according to claim 1, characterized in that the catalyst is prepared from diethyl aluminum chloride and vanadium triacetylacetonate, and the complex-forming substance is anisole.

7. The process according to claim 1, characterized in that the catalyst is prepared from diethyl aluminum chloride and vanadium triacetylacetonate, and the complex-forming substance is diphenyl ether.

8. The process according to claim 1, characterized in that the catalyst is prepared from diethyl aluminum monochloride and vanadyl triethylate, and the complexing agent is diphenyl ether.

9. The process according to claim 1, characterized in that the catalyst is prepared from diethyl aluminum monochloride and vanadyl diacetylacetonate, and the complexing agent is triphenylamine.

10. The process according to claim 1, characterized in that the monomers are ethylene and propylene.

11. The process according to claim 1, characterized in that the monomers are ethylene and butene-1.

References Cited

UNITED STATES PATENTS 2,951,066   8/1960   Coover et al. _____ 260—93.7

FOREIGN PATENTS 564,772   8/1958   Belgium.
583,039   1/1960   Belgium.
809,717   3/1959   Great Britain.

JOSEPH L. SCHOFER, *Primary Examiner.*

L. E. DELMAN, *Assistant Examiner.*